(12) United States Patent
Imajo

(10) Patent No.: US 6,359,714 B1
(45) Date of Patent: Mar. 19, 2002

(54) RELAY SYSTEM

(75) Inventor: Yoshihiro Imajo, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/200,708

(22) Filed: Nov. 27, 1998

(30) Foreign Application Priority Data

Nov. 28, 1997 (JP) ............................................. 9-327544
Nov. 17, 1998 (JP) ........................................... 10-327014

(51) Int. Cl.⁷ .............................................. H04B 10/12
(52) U.S. Cl. ...................................... 359/179; 359/145
(58) Field of Search ................................ 359/145, 179, 359/177

(56) References Cited

U.S. PATENT DOCUMENTS

| | | | | |
|---|---|---|---|---|
| 4,897,883 A | * | 1/1990 | Harrington | 359/145 |
| 5,479,595 A | * | 12/1995 | Isrealsson | 359/145 |
| 5,615,246 A | * | 3/1997 | Beveridge | 379/56 |
| 5,689,355 A | * | 11/1997 | Okubo | 359/145 |
| RE35,736 E | * | 2/1998 | Powell | 359/145 |
| 6,018,406 A | * | 1/2000 | Ishimatsu | 359/110 |

FOREIGN PATENT DOCUMENTS

JP 9-130322 * 5/1997

* cited by examiner

*Primary Examiner*—Leslie Pascal
(74) *Attorney, Agent, or Firm*—Jacobson Holman, PLLC

(57) ABSTRACT

The present invention is to provide a relay system capable of covering a wide silent zone, repeating various kinds of signals with a simple configuration, and facilitating the system management. In such a relay system, a fixed central station converts into a radio-frequency signal a signal input from a public telecommunication network through a radio modulator, and transduces the radio-frequency signal into an optical signal for output to a plurality of fixed relay stations distributed in a silent zone. On the other hand, each of the fixed relay stations transduces the optical signal into a radio-frequency signal for radiation into the silent zone through a leakage coaxial cable.

9 Claims, 10 Drawing Sheets

RELAY SYSTEM

BACKGROUND OF THE INVENTION

1. Field of the Invention

This invention relates to a relay system for covering silent zones in a mobile communications system, and in particular to a relay system capable of providing radio communication of desired communication quality throughout a complicated-shaped silent zone, repeating various kinds of signals with a simple configuration, and facilitating the system management.

2. Description of the Related Art

A public vehicular communications system such as a mobile and portable telephone system, a personal handy-phone system (PHS) or a radio paging system (hereinbelow, generically called a "mobile communications system") is equipped with vehicular communication base stations (hereinbelow, simply called "base stations") connected by wire to an upper network such as a public telecommunication network (PSTN or ISDN), in which the base stations realize radio communication with mobile stations such as portable telephones.

In case of the mobile and portable telephone system, each base station has an area communicable by radio (coverage area) that ranges from several kilometers to ten and several kilometers. To secure a wider service area while effectively using the frequencies, such a system that coverage areas are arranged like cells, called a cellular system, has been adopted.

In a mobile communications system using such a cellular system, it would be possible to provide good radio communication with mobile radio terminals in outdoor environments such as ones on the ground, but difficult to realize radio communication with terminals inside a tunnel, an underground shopping center, a basement and aboveground stories in a large-scale building because of the difficulty of delivering radio waves.

Such an area as to make radio communication impossible is called a "silent zone," and commonly appears not only in the mobile communications but also any other communications using radio waves, such as radio communications for business use including police radio, fire fighting radio and train radio, television broadcasting and radio broadcasting.

To enable radio communication in the silent zone, an apparatus, called a repeater-amplifier, is typically used as auxiliary means.

The apparatus is accompanied with a first antenna installed at a point to which a base station (or a broadcasting station) can transmit radio waves for proper communication, and a second antenna installed in the silent zone. In such a configuration, an incoming radio-frequency signal to the first antenna is amplified and transmitted through a cable to the second antenna in the silent zone. The amplified radio-frequency signal is then radiated from or broadcast through the second antenna.

A down link from the base station to a mobile station can thus be secured. An up link from a mobile station to the base station can also be allowed by amplifying a radio-frequency signal from the mobile station, transmitting it to the first antenna through the cable and radiating the amplified radio-frequency signal from the first antenna for transmission to the base station. It is therefore possible to realize radio communication in the silent zone.

So far, two methods of installing the second antenna have been used: one using a leakage coaxial system and the other using an optical fiber system. But in using either of the methods without any consideration, especially for mobile communications such as portable telephones, the installation of the second antenna can merely expand the coverage area of the base station at which a relay is received from the silent zone. This increases the amount of communication to be processed by the base station, and may cause the base station to exceed its capacity when used in an area such as a metropolitan area in which demand for communication is so great that incoming and outgoing lines from portable stations in the coverage area could not be processed.

Since an upper wired network of high quality such as an ISDN network has recently been popularized, installation of a radio modulator-demodulator directly connected by wire to the upper network such as ISDN is considered nowadays.

Such a radio modulator-demodulator modulates a radio-frequency signal with an input signal from the upper network and distributes or allots the radio-frequency signal to an antenna in the silent zone (the above-mentioned second antenna), while it receives a radio-frequency signal from a mobile station in the silent zone through the antenna and demodulates it for output to the upper network.

Referring now to FIGS. 9 and 10, such conventional relay systems will be described. FIG. 9 is a diagram for explaining the concept of a conventional relay system using a leakage coaxial cable, and FIG. 10 is a diagram for explaining the concept of another conventional relay system using optical fiber.

The relay system using a leakage coaxial cable shown in FIG. 9 is constituted of a public telecommunication network 1 such as PSTN or ISDN, a radio modulator 2 connected by wire to the public telecommunication network 1, a coaxial cable 3, an amplifier 4, a leakage coaxial cable 5 and auxiliary amplifiers 6.

In FIGS. 9 and 10, only the down link is shown for simplification.

Hereinbelow, description is specifically made with respect to each portion.

The radio modulator 2 modulates a carrier with an incoming signal from the public telecommunication network 1 through a cable to obtain a radio-frequency signal and outputs the radio-frequency signal through the coaxial cable 3.

The amplifier 4 amplifies the radio-frequency signal taken in through the coaxial cable 3 and outputs the amplified signal to the leakage coaxial cable 5.

Parts of the leakage coaxial cable 5 are disposed linearly across the silent zone so as to transmit the radio-frequency signal from one end to the other while gradually leaking it to the outside. Thus the leakage coaxial cable 5 serves as an antenna.

Each auxiliary amplifier 6 is inserted between two sections or parts of the leakage coaxial cable 5 to amplify the radio-frequency signal passing through the leakage coaxial cable 5 so as to extend the extension distance of the leakage coaxial cable 5.

Next, operation of the relay system using the leakage coaxial cable of FIG. 9 will be described.

The radio modulator 2 modulates a radio-frequency signal with the incoming signal from the public telecommunication network 1 for output to the amplifier 4 through the coaxial cable 3.

The amplifier 4 amplifies the radio-frequency signal for output to the leakage coaxial cable 5.

The leakage coaxial cable 5, like an antenna, transmits the radio-frequency signal from the amplifier 4 while leaking it to the outside. The auxiliary amplifier 6 amplifies the radio-frequency signal attenuated due to a leak from the preceding part of the leakage coaxial cable 5 and outputs it to the subsequent part of the leakage coaxial cable 5. The subsequent part of the leakage coaxial cable 5 in turn leaks the amplified radio-frequency signal. Thus, the radio-frequency signal is imparted through the public telecommunication network 1 to a mobile station existing in the silent zone.

The relay system using optical fiber shown in FIG. 10 is constituted of a public telecommunication network 1, optical fiber 7, a fixed central station 10, an optical star coupler 20 and a plurality of fixed relay stations 30.

The fixed central station 10 includes, in addition to a radio modulator 2 and an amplifier 4 similar to those in the relay system of FIG. 9, an electro-optic transducer (E/O) transducer 11 for transducing the radio-frequency signal amplified by the amplifier 4 into an optical signal. Each of the fixed relay stations 30 includes, in addition to an amplifier 34 similar to the amplifier 4 in the relay system of FIG. 9, an opto-electric (O/E) transducer 31 for transducing the optical signal into a radio-frequency signal and an antenna 32 from which the signal amplified by the amplifier 34 is radiated.

Hereinbelow, description is specifically made with respect to each portion.

The radio modulator 2 of the fixed central station 10 converts the signal input from the public telecommunication network 1 into a radio-frequency signal for output to the amplifier 4.

The amplifier 4 amplifies the radio-frequency signal from the radio modulator 2 for output to the E/O transducer 11.

The E/O transducer 11 transduces the amplified radio-frequency signal into an optical signal for output to the optical star coupler 20.

Thus, the fixed central station 10 converts the signal input from the public telecommunication network 1 into a radio-frequency signal, amplified the radio-frequency signal, modulates the carrier of an optical signal with the amplified radio-frequency signal, transduces the signal into the optical signal for output to the optical star coupler 20.

The optical star coupler 20 distributes the input optical signal to the plurality of fixed relay stations 30 through optical fiber lines 7.

A number of fixed relay stations 30 are arranged in a silent zone, each of which transduces the input optical signal into a radio-frequency signal through the O/E transducer 31 and amplifies it at the amplifier 34 for radiation to the outside through the antenna 32.

In general, one antenna has a limited area for radio communication of desired quality, depending on the gain and directivity of the antenna 32 and its radio-frequency output. Therefore, the number of fixed relay stations 30 varies according to the dimensions of the silent zone so that radio communication of desired quality can be provided throughout the silent zone.

Next, operation of the conventional relay system using optical fiber shown in FIG. 10 will be described.

At first, the fixed central station 10 modulates a carrier with the incoming signal from the public telecommunication network 1 to obtain a radio-frequency signal, amplifies the radio-frequency signal and transduces amplified one into an optical signal for output to the optical star coupler 20.

The optical star coupler 20 distributes the optical signal and outputs it to the plurality of fixed relay stations 30 through respective optical fiber lines 7. Each of the fixed relay stations 30 transduces the input optical signal into the radio-frequency signal, amplifies and radiates it from the antenna 32. The signal input from the public telecommunication network 1 can thus be transmitted to the silent zone.

The conventional relay system using the leakage coaxial cable is adapted to a linear-shaped silent zone such as a tunnel. However, since the leakage coaxial cable leaks a constant amount of high-frequency electric power per unit length to the outside in the form of electromagnetic waves, the loss of radio-frequency signals increases in a range of high-frequency bands such as 1.5 GHz and 1.9 GHz recently allocated for each equipment such as a portable telephone or PHS, in addition to the loss due to leakage. It is therefore difficult to maintain desired communication quality in the silent zone.

Further, a coming mobile communications system, called an FPLMTS, is expected to use a band of 2 GHz as worldwide common allocation. When transmitting signals in such a high-frequency band, a large number of auxiliary amplifiers must be inserted in order to compensate the loss of radio-frequency signals from the leakage coaxial cable. In this case, the auxiliary amplifiers would be inserted at intervals of about 100 meters. On the other hand, the number of connectable auxiliary amplifiers and parts of the leakage coaxial cable is limited depending on the wave quality such as required distortion and noise, and the degree of distortion and the level of noise generated in the amplifier and the auxiliary amplifier. This makes it difficult to lay an extended leakage coaxial cable with many auxiliary amplifiers, and if the silent zone is wide, it may be found impossible to cover the entire silent zone.

Furthermore, the diameter of the coaxial cable for wire-connecting the radio modulator and the amplifier must be large enough to cope with such a high frequency, and this also raises the difficulty in construction work.

In contrast, the conventional relay system using optical fiber is easy to construct because optical fiber has a small outside diameter of about 125 $\mu$m and is flexible and light. Optical fiber also has a low-loss characteristic, the attenuation of which is 0.5 dB or less per one-kilometer transmission distance, and a sufficient transmission bandwidth of several THz per one-kilometer transmission distance. These characteristics of optical fiber can cope with the high frequencies and is enough to keep an adequate transmission distance, but since waves are radiated from the antenna in the form of a spot, it would also be difficult to provide radio communication of desired communication quality throughout a silent zone spreading in a line such as a tunnel or underpass.

To compensate mutual disadvantages of the relay system using the leakage coaxial cable and the relay system using the optical fiber, the third approach is considered in which the system is based on the relay system using optical fiber except for the use of a leakage coaxial cable instead of antennas.

For example, such an invention is disclosed in Japanese application laid-open publication No. 9-130322, entitled "Relay Amplification System for Vehicular Communication," but this application does not take into account a relay of various kinds of signals including ones for communication through a public telecommunication network other than radio communications. In this system, if such various kinds of signals need repeating, each individual relay station must be provided for each type of signal, and this also makes it difficult to construct the system.

SUMMARY OF THE INVENTION

It is an object of the present invention to provide a relay system capable of providing radio communication of desired communication quality throughout a complicated-shaped silent zone, repeating various kinds of signals with a simple configuration, and facilitating the system management.

According to the present invention, there is provided a relay system comprising a fixed central station, which transduces a radio-frequency signal into an optical signal to output the optical signal for repeating the radio-frequency signal; and a plurality of fixed relay stations, distributed in a silent zone, each of which transduces into a radio-frequency signal the optical signal input from said fixed central station through optical fiber for radiation into the silent zone through a leakage coaxial cable laid across the silent zone, wherein said fixed central station includes a radio modulator for modulating a specified carrier frequency with a signal input from a public telecommunication network to obtain the radio-frequency signal, whereby any mobile station can receive radio signals of desired communication quality from the public telecommunication network.

In the second aspect of the present invention, there is provided a relay system comprising a fixed central station, which transduces a radio-frequency signal into an optical signal to output the optical signal for repeating the radio-frequency signal, and transduces into a radio-frequency signal an optical signal input from a silent zone through optical fiber; and a plurality of fixed relay stations, distributed in the silent zone, each of which transduces into a radio-frequency signal the optical signal input from said fixed central station through optical fiber for radiation into the silent zone through a leakage coaxial cable laid across the silent zone, and transduces into an optical signal a radio-frequency signal received through the leakage coaxial cable from a mobile station existing in the silent zone for output to said fixed central station, wherein said fixed central station includes a radio modulator for modulating a specified carrier frequency with a signal input from a public telecommunication network to obtain the radio-frequency signal, and a radio demodulator for demodulating the radio-frequency signal transduced from the optical signal from said fixed relay station for output to the public telecommunication network, whereby any down-link signal from the public telecommunication network can be repeated throughout the silent zone, while any up-link signal radiated from mobile stations existing in the silent zone can be repeated to the public telecommunication network.

In the third aspect of the present invention, there is provided a relay system comprising a fixed central station, installed outside of silent zones, which transduces a radio-frequency signal into an optical signal to output the optical signal for repeating the radio-frequency signal, and transduces into a radio-frequency signal an optical signal input from a silent zone through optical fiber; and a plurality of fixed relay stations, distributed in the silent zone, each of which transduces into a radio-frequency signal the optical signal input from said fixed central station through optical fiber for radiation into the silent zone through a leakage coaxial cable laid across the silent zone, and transduces into an optical signal a radio-frequency signal received through the leakage coaxial cable from a mobile station existing in the silent zone for output to said fixed central station, wherein said fixed central station includes an antenna, a radio part and a wired part; said radio part outputs an incoming signal from said antenna as a radio-frequency signal and takes in a radio-frequency signal to radiate the input radio-frequency signal from said antenna to the outside; and said wired part includes plural radio modulators for modulating individually specified carrier frequencies with various kinds of signals input from the outside through cables to obtain radio-frequency signals, a synthesizer for combining the radio-frequency signal from said radio part with the radio-frequency signals from said plural radio modulators to output a combined radio-frequency signal, an electro-optic transducer for transducing the combined radio-frequency signal into an optical signal for output to said fixed relay stations, an opto-electric transducer for transducing into radio-frequency signals the optical signals input from said fixed relay stations, a first distributor for distributing the radio-frequency signals input from said opto-electric transducer into a radio-frequency signal to be radiated from said antenna of said radio part and radio-frequency signals to be output to the outside through the cables, a second distributor for distributing the radio-frequency signals input from said first distributor for output to the outside through the cables, and plural radio demodulators for demodulating various kinds of signals from the radio-frequency signals respectively input from said second distributor, whereby various kinds of signals can be repeated with a simple configuration in such a way that any down-link signal from a public telecommunication network is repeated throughout the silent zone and any up-link signal radiated from mobile stations existing in the silent zone is repeated to the public telecommunication network.

In the fourth aspect of the present invention, there is provided a relay system comprising a fixed central station, installed outside of silent zones, which transduces a radio-frequency signal into an optical signal to output the optical signal for repeating the radio-frequency signal, and transduces into a radio-frequency signal an optical signal input from a silent zone through optical fiber; and a plurality of fixed relay stations, distributed in the silent zone, each of which transduces into a radio-frequency signal the optical signal input from said fixed central station through optical fiber for radiation into the silent zone through a leakage coaxial cable laid across the silent zone, and transduces into an optical signal a radio-frequency signal received through the leakage coaxial cable from a mobile station existing in the silent zone for output to said fixed central station, wherein each of said fixed relay stations includes an opto-electric transducer for transducing the optical signal from said fixed central station into a radio-frequency signal, a distributor for distributing the radio-frequency signal to two branches, a demodulator for demodulating a control signal from the radio-frequency signal distributed to one branch for control of the fixed relay station, a control unit for controlling each part of the fixed relay station in accordance with the control signal, a multiplexer for outputting the radio-frequency signal distributed to the other branch to the leakage coaxial cable and outputting an incoming radio-frequency signal from the leakage coaxial cable, and an electro-optic transducer for transducing the radio-frequency signal from said multiplexer into an optical signal for output to said fixed central station, whereby even when the silent zone is of linear structure such as a tunnel or underpass, any down-link signal from a public telecommunication network can be repeated throughout the silent zone and any up-link signal radiated from mobile stations existing in the silent zone can be repeated to the public telecommunication network, while remotely controlling system setting to said fixed relay stations.

In the fifth aspect of the present invention, there is provided a relay system comprising a fixed central station, installed outside of silent zones, which transduces a radio-frequency signal into an optical signal to output the optical signal for repeating the radio-frequency signal, and transduces into a radio-frequency signal an optical signal input from a silent zone through optical fiber; and a plurality of fixed relay stations, distributed in the silent zone, each of which transduces into a radio-frequency signal the optical signal input from said fixed central station through optical fiber for radiation into the silent zone through a leakage coaxial cable laid across the silent zone, and transduces into an optical signal a radio-frequency signal received through the leakage coaxial cable from a mobile station existing in the silent zone for output to said fixed central station, wherein each of said fixed relay stations includes an opto-electric transducer for transducing the optical signal from said fixed central station into a radio-frequency signal, a multiplexer for outputting the radio-frequency signal to the leakage coaxial cable and outputting an incoming radio-frequency signal from the leakage coaxial cable, a control unit for monitoring the operation status of each part of the fixed relay station to output a supervisory signal, a modulator for modulating the supervisory signal into a radio-frequency signal, a synthesizer for combining the radio-frequency signal modulated by said modulator and the radio-frequency signal input from said multiplexer, and an electro-optic transducer for transducing the radio-frequency signal from said synthesizer into an optical signal for output to said fixed central station, whereby even when the silent zone is of linear structure such as a tunnel or underpass, any down-link signal from a public telecommunication network can be repeated throughout the silent zone and any up-link signal radiated from mobile stations existing in the silent zone can be repeated to the public telecommunication network, while remotely monitoring the operation status of said fixed relay stations.

In the sixth aspect of the present invention, there is provided a relay system comprising a fixed central station, installed outside of silent zones, which transduces a radio-frequency signal into an optical signal to output the optical signal for repeating the radio-frequency signal, and transduces into a radio-frequency signal an optical signal input from a silent zone through optical fiber; and a plurality of fixed relay stations, distributed in the silent zone, each of which transduces into a radio-frequency signal the optical signal input from said fixed central station through optical fiber for radiation into the silent zone through a leakage coaxial cable laid across the silent zone, and transduces into an optical signal a radio-frequency signal received through the leakage coaxial cable from a mobile station existing in the silent zone for output to said fixed central station, wherein each of said fixed relay stations includes an opto-electric transducer for transducing the optical signal from said fixed central station into a radio-frequency signal, a distributor for distributing the radio-frequency signal to two branches, a demodulator for demodulating a control signal from the radio-frequency signal distributed to one branch for control of the fixed relay station, a control unit for controlling each part of the fixed relay station in accordance with the control signal and monitoring the operation status of each part of the fixed relay station to output a supervisory signal, a multiplexer for outputting the radio-frequency signal distributed to the other branch to the leakage coaxial cable and outputting an incoming radio-frequency signal from the leakage coaxial cable, a modulator for modulating the supervisory signal into a radio-frequency signal, a synthesizer for combining the radio-frequency signal modulated by said modulator and the radio-frequency signal input from said multiplexer, and an electro-optic transducer for transducing the radio-frequency signal from said synthesizer into an optical signal for output to said fixed central station, whereby even when the silent zone is of linear structure such as a tunnel or underpass, any down-link signal from a public telecommunication network can be repeated throughout the silent zone and any up-link signal radiated from mobile stations existing in the silent zone can be repeated to the public telecommunication network, while remotely controlling recovery from abnormality in a fixed relay station and system setting to the fixed relay station.

In the seventh aspect of the present invention, there is provided a fixed central station installed outside of silent zones, comprising an antenna, a radio part, a wired part and a control unit, which transduces a radio-frequency signal into an optical signal for repeating the radio-frequency signal to output the optical signal through optical fiber to fixed relay stations installed in a silent zone, and transduces into a radio-frequency signal an optical signal input from each fixed relay station through optical fiber, wherein said radio part outputs an incoming signal from said antenna as a radio-frequency signal and takes in a radio-frequency signal to radiate the input radio-frequency signal from said antenna to the outside; said wired part includes plural radio modulators for modulating individually specified carrier frequencies with various kinds of signals input from the outside or said control unit through cables to obtain radio-frequency signals, a synthesizer for combining the radio-frequency signal from said radio part with the radio-frequency signals from said plural radio modulators to output a combined radio-frequency signal, an electro-optic transducer for transducing the combined radio-frequency signal into an optical signal for output to said fixed relay stations, an opto-electric transducer for transducing into radio-frequency signals the optical signals input from said fixed relay stations, a first distributor for distributing the radio-frequency signals input from said opto-electric transducer to a radio-frequency signal to be radiated from said antenna of said radio part and radio-frequency signals to be output to the outside through cables, a second distributor for distributing the radio-frequency signals input from said first distributor for output to the outside through the cables, and plural radio demodulators for demodulating various kinds of signals from the radio-frequency signals respectively input from said second distributor; and said control unit, connected to one of said radio modulators and one of said radio demodulators, recognizes the operation status of each fixed relay station based on a supervisory signal input from the fixed relay station through the radio demodulator to output a control signal to the radio modulator for control of the fixed relay station in accordance with the operation status, whereby even when the silent zone is of linear structure such as a tunnel or underpass, various kinds of signals can be repeated with a simple configuration using a pair of optical fiber cables in such a way that any down-link signal from a public telecommunication network is repeated throughout the silent zone and any up-link signal radiated from mobile stations existing in the silent zone is repeated to the public telecommunication network, while remotely controlling recovery from abnormality in a fixed relay station and system setting to the fixed relay station by monitoring the operation status of each fixed relay station at said fixed central station.

In the eighth aspect of the present invention, said control unit of said fixed central station outputs a signal indicative of the operation status of each fixed relay station to an upper monitor station located outside, and outputs a control signal to the radio modulator for control of the fixed relay station in accordance with an instruction signal from the upper monitor station, thereby remotely controlling recovery from abnormality in a fixed relay station and system setting to the fixed relay station while monitoring the operation status of each fixed relay station at the upper monitor station.

In the ninth aspect of the present invention, said control unit of said fixed central station outputs to the modulator such a control signal as to normalize a fixed relay station based on the supervisory signal from the fixed relay station when said fixed central station recognizes occurrence of abnormality in the fixed relay station, thereby normalizing a fixed relay station immediately when abnormality occurs in the fixed relay station while monitoring the operation status of each fixed relay station at said central station.

In the tenth aspect of the present invention, said relay system according to the sixth aspect of the present invention comprises said fixed central station according to the seventh aspect of the present invention, whereby even when the silent zone is of linear structure such as a tunnel or underpass, various kinds of signals can be repeated with a simple configuration using a pair of optical fiber cables in such a way that any down-link signal from a public telecommunication network is repeated throughout the silent zone and any up-link signal radiated from mobile stations existing in the silent zone is repeated to the public telecommunication network, while remotely controlling recovery from abnormality in a fixed relay station and system setting to the fixed relay station by monitoring the operation status of each fixed relay station at said fixed central station.

In the eleventh aspect of the present invention, said relay system according to the sixth aspect of the present invention comprises said fixed central station according to the eighth aspect of the present invention, thereby remotely controlling recovery from abnormality in a fixed relay station and system setting to the fixed relay station while monitoring the operation status of each fixed relay station at the upper monitor station.

In the twelfth aspect of the present invention, said relay system according to the sixth aspect of the present invention comprises said fixed central station according to the ninth aspect of the present invention, thereby normalizing a fixed relay station immediately when abnormality occurs in the fixed relay station while monitoring the operation status of each fixed relay station at said central station.

DESCRIPTION OF REFERENCE NUMERALS

Figure 1:
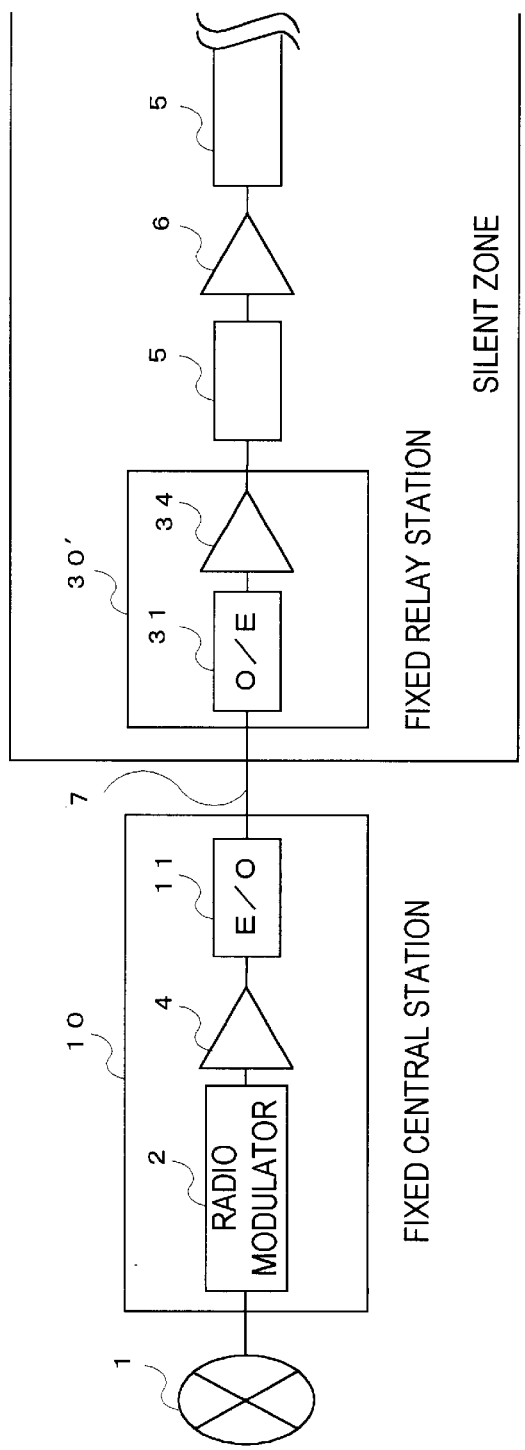
FIG. 1 is a block diagram of a relay system according to the first embodiment of the present invention.

1 . . . Public Telecommunication Network, 2 . . . Radio Modulator, 3 . . . Coaxial Cable, 4 . . . Amplifier, 5 . . . Leakage Coaxial Cable, 6 . . . Auxiliary Amplifier, 7 . . . Optical Fiber, 8 . . . Radio Demodulator, 10 . . . Fixed central station, 11 . . . Electro-Optic Transducer, 12 . . . Antenna, 13 . . . Multiplexer, 14 . . . Filter, 15 . . . Synthesizer, 16 . . . Distributor, 17 . . . Control Unit, 18 . . . Alarm Indicator, 20 . . . Optical Star Coupler, 21 . . . Optical Branch Unit, 30, 30' . . . Fixed relay station, 31 . . . Opto-Electric Transducer, 32 . . . Antenna, 33 . . . Multiplexer, 34 . . . Amplifier, 35 . . . Synthesizer, 36 . . . Distributor, 40 . . . Radio Part, 41 . . . Wired Part, 43 . . . Control Unit.

DESCRIPTION OF THE PREFERRED EMBODIMENT

Referring to the drawings, embodiments of the present invention will be described.

According to the first embodiment of the present invention, a relay system (first system) is designed to modulate a carrier with a signal input from a public telecommunication network to obtain a radio-frequency signal, transduce the radio-frequency signal into an optical signal, transmit the optical signal up to a silent zone through optical fiber, transduce the optical signal into a radio-frequency signal inside the silent zone, and radiate the radio-frequency signal by means of a leakage coaxial cable. Thus the first system enables the input signal from the public telecommunication network to be repeated throughout the silent zone.

As shown in FIG. 1, the first system is mainly constituted of a fixed central station 10, directly connected by wire to a public telecommunication network 1 such as PSTN or ISDN, which transduces a radio-frequency signal into an optical signal by modulating a subcarrier with a signal from the public telecommunication network 1 to obtain a radio-frequency signal, amplifying the radio-frequency signal and modulating a main carrier of the optical signal with the amplified radio-frequency signal; an optical fiber cable 7 for transmitting the optical signal from the fixed central station 10; a fixed relay station 30' which transduces into a radio-frequency signal the optical signal input from the fixed central station 10 through the optical fiber cable 7; a leakage coaxial cable 5; and auxiliary amplifiers 6. FIG. 1 is a block diagram of a relay system according to the first embodiment of the present invention.

Figure 9:
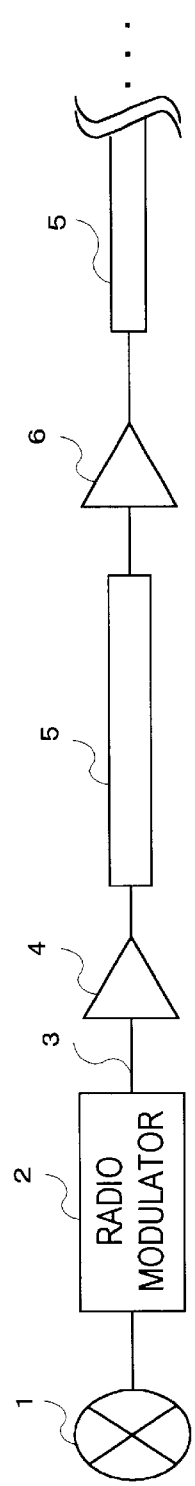
FIG. 9 is a block diagram for explaining the concept of a conventional relay system using a leakage coaxial cable.

Although each specific portion will be described below, since the fixed central station 10 and the optical fiber cable 7 are the same as those of the conventional relay system of FIG. 10, and the leakage coaxial cable 5 and auxiliary amplifiers 6 are the same as those of the conventional relay system of FIG. 9, the description thereof is omitted.

Figure 10:
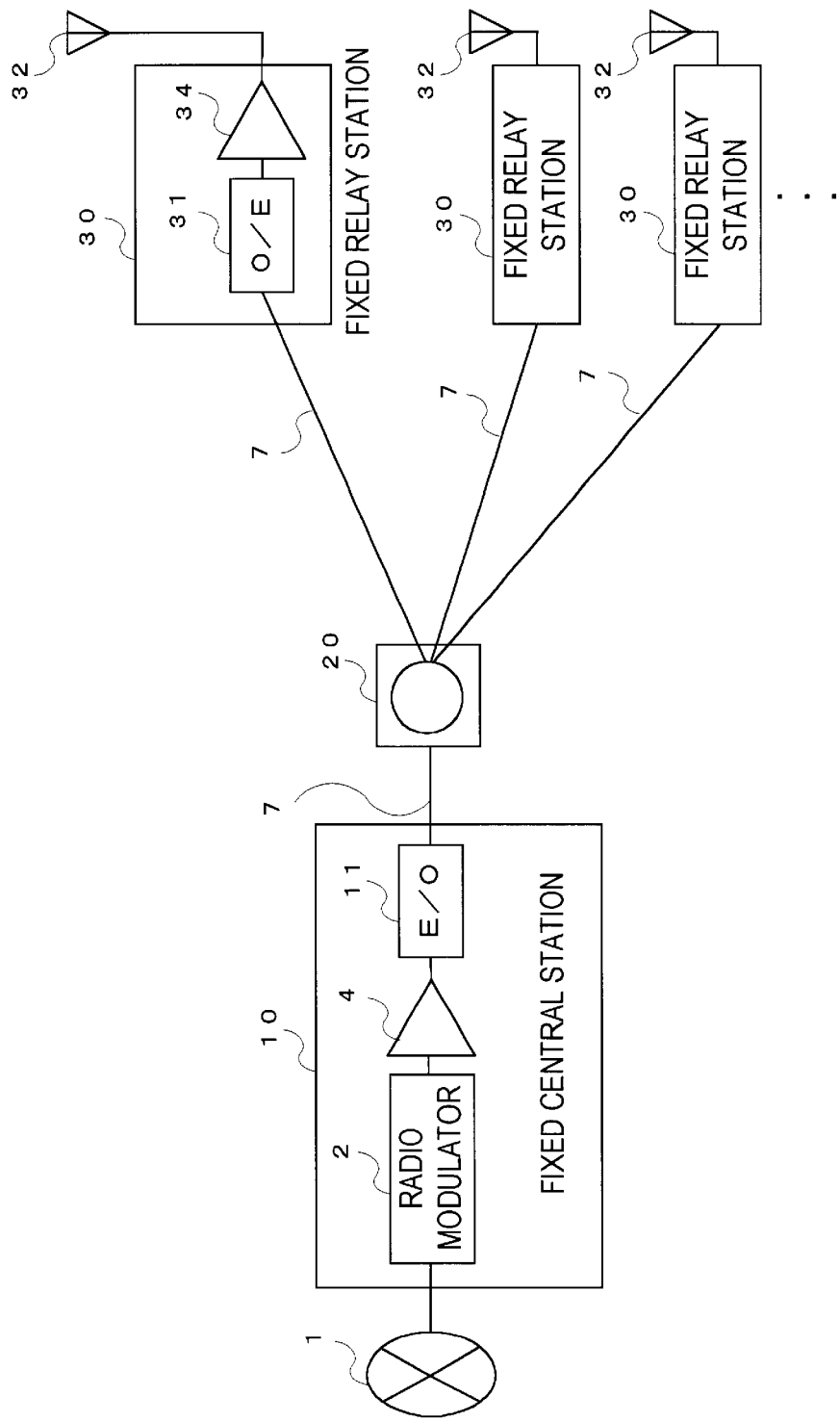
FIG. 10 is a block diagram for explaining the concept of a conventional relay system using optical fiber.

As similar to that of the conventional relay system of FIG. 10, the fixed relay station 30' includes an opto-electric transducer 31 for transducing into an electric radio-frequency signal an optical signal input through the optical fiber cable 7, and an amplifier 34, but different from that of FIG. 10 in that the radio-frequency signal amplified by the amplifier 34 is radiated using the leakage coaxial cable 5 instead of the antenna.

That is, the first system is such that the fixed relay station 30' transduces the optical signal, transduced at the fixed central station 10 from a signal from the public telecommunication network 1 and introduced into the silent zone, into a radio-frequency signal for radiation through the leakage coaxial cable 5. This allows any mobile station in the silent zone to receive input radio signals of desired communication quality from the public telecommunication network 1.

Figure 2:
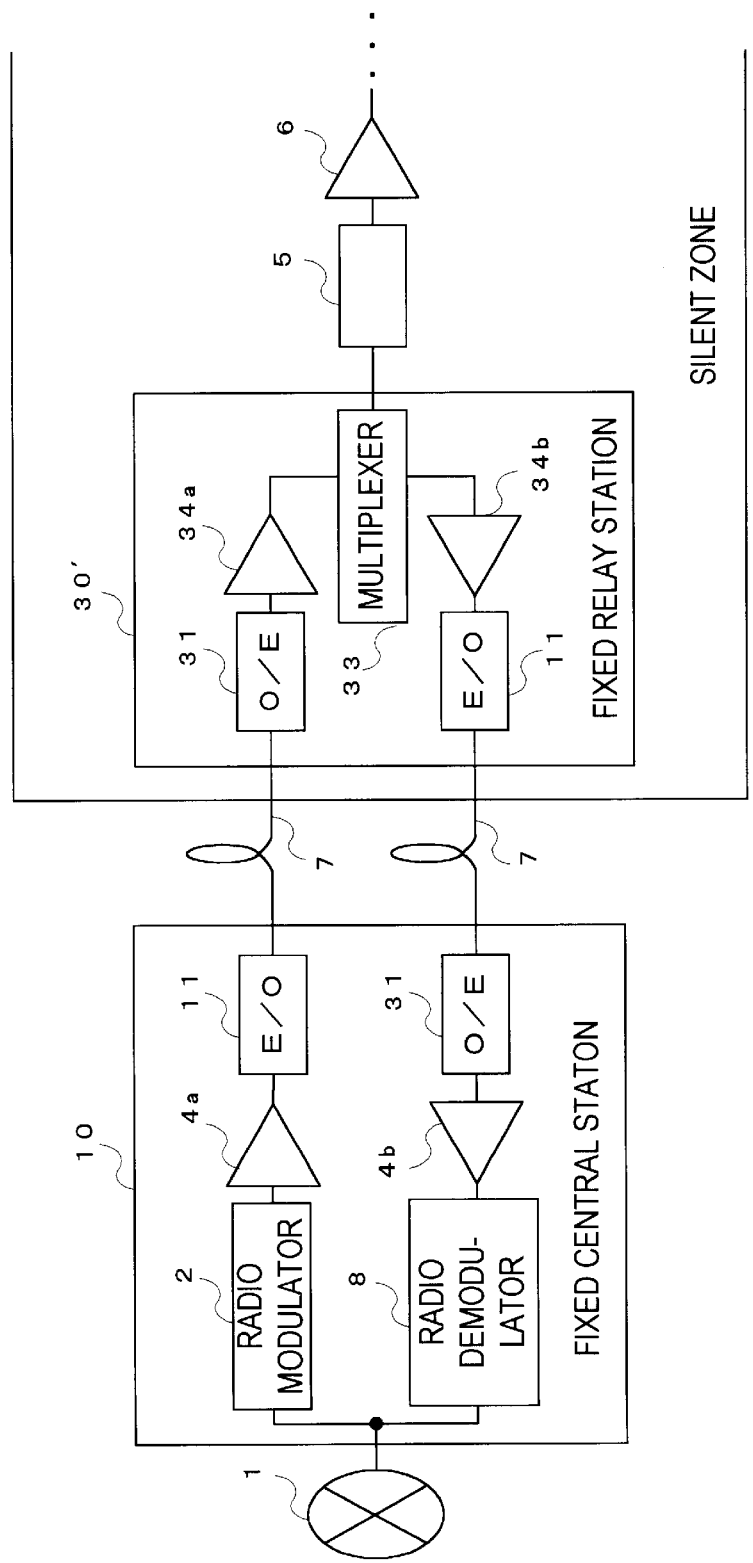
FIG. 2 is a block diagram of a relay system according to the second embodiment of the present invention.

The first system shown in FIG. 1 is adapted to a relay system using only the down links from a public telecommunication network to mobile stations such as pagers, but it can be modified to be a relay system according to the second embodiment of the present invention (second system) so as to deal with up-link signals as shown in FIG. 2 for effective use with two-way communication equipment including portable telephones. FIG. 2 is a block diagram of such a relay system according to the second embodiment of the present invention.

As shown in FIG. 2, the second system is mainly constituted of a fixed central station 10, directly connected by wire to the public telecommunication network 1 in the same manner as that of the first system of FIG. 1; two optical fiber cables 7 provided for down-link and up-link signals, respectively; a fixed relay station 30'; the leakage coaxial cable 5; and the auxiliary amplifiers 6. The second system somewhat differs from the first system in configurations of the fixed central station 10 and the fixed relay station 30'.

Although each specific portion will be described below, the leakage coaxial cable 5 and the auxiliary amplifiers 6 are the same as those previously described, and the description thereof is omitted.

The fixed central station 10 of the second system includes a radio modulator 2 for modulating a radio-frequency wave with a signal input from the public telecommunication network 1 to output it as a radio-frequency signal, a first amplifier 4a for amplifying the radio-frequency signal from the radio modulator 2, an electro-optic transducer 11 for transducing the amplified radio-frequency signal into an optical signal for transmission of the optical signal to the fixed relay station 30' through one optical fiber cable 7 for down links, an opto-electric transducer 31 for transducing into a radio-frequency signal an optical signal input from the fixed relay station 30' through the other optical fiber cable 7 for up links, a second amplifier 4b for amplifying the input signal from the opto-electric transducer 31, and a radio demodulator 8 for demodulating the amplified radio-frequency signal for output to the public telecommunication network 1.

The fixed relay station 30' of the second system includes an opto-electric transducer 31 for transducing into an electric radio-frequency signal the optical signal input from the optical fiber cable 7 for down links, a first amplifier 34a for amplifying the radio-frequency signal to be output, a second amplifier 34b for amplifying an incoming radio-frequency signal from a mobile station through the leakage coaxial cable 5, an electro-optical transducer 11 for transducing the input radio-frequency signal into an optical signal for output to the optical fiber for up links, and a multiplexer 33 for outputting the down-link radio-frequency signal from the first amplifier 34a to the leakage coaxial cable 5 and outputting to the amplifier 34b the incoming up-link radio-frequency signal from the mobile station through the leakage coaxial cable 5.

Next, operation of the second system will be described.

When a signal to a mobile station existing in the silent zone is output from the public telecommunication network 1 to the fixed central station 10, the fixed central station 10 modulates a carrier with the signal through the radio modulator 2 to obtain a radio-frequency signal, amplifies the radio-frequency signal at the first amplifier 4a and transduces the amplified one into an optical signal through the electro-optic transducer 11 for output to the optical fiber cable 7 for down links.

Upon receipt of the optical signal through the optical fiber cable 7 for down links, the fixed relay station 30' transduces the optical signal into an electric radio-frequency signal by means of the opto-electric transducer 31, and amplifies it at the first amplifier 34a for output to the leakage coaxial cable 5 via the multiplexer 33.

The radio-frequency signal is then radiated from the leakage coaxial cable 5 so that it can arrive at a corresponding mobile station in the silent zone.

On the other hand, an incoming radio-frequency signal from a mobile station is output from the leakage coaxial cable 5 to the second amplifier 34b by means of the multiplexer 33 of the fixed relay station 30', amplified at the second amplifier 34b, and transduced into an optical signal by means of the electro-optic transducer 11 for output to the optical fiber cable 7 for up links.

Upon receipt of the optical signal through the optical fiber cable 7 for up links, the fixed central station 10 transduces the optical signal into an electric radio-frequency signal by means of the opto-electric transducer 31, amplifies it at the second amplifier 4b, and demodulates a signal from the amplified radio-frequency signal through the radio demodulator 8 for output to the public telecommunication network 1.

Thus, the second system can use such easy-to-construct optical fiber as to repeat not only down-link signals throughout the silent zone but also up-link signals radiated from mobile stations traveling inside the silent zone.

The first and second systems represent the basic structure of the present invention, in which band-pass filters may be inserted as required to prevent waves other than target ones from being input through the leakage coaxial cable to the radio demodulator of the fixed central station, and to eliminate components of distortion caused by non-linearity of the amplifiers from radiating as spurious components. Description of such band-pass filters is omitted here.

Figure 3:
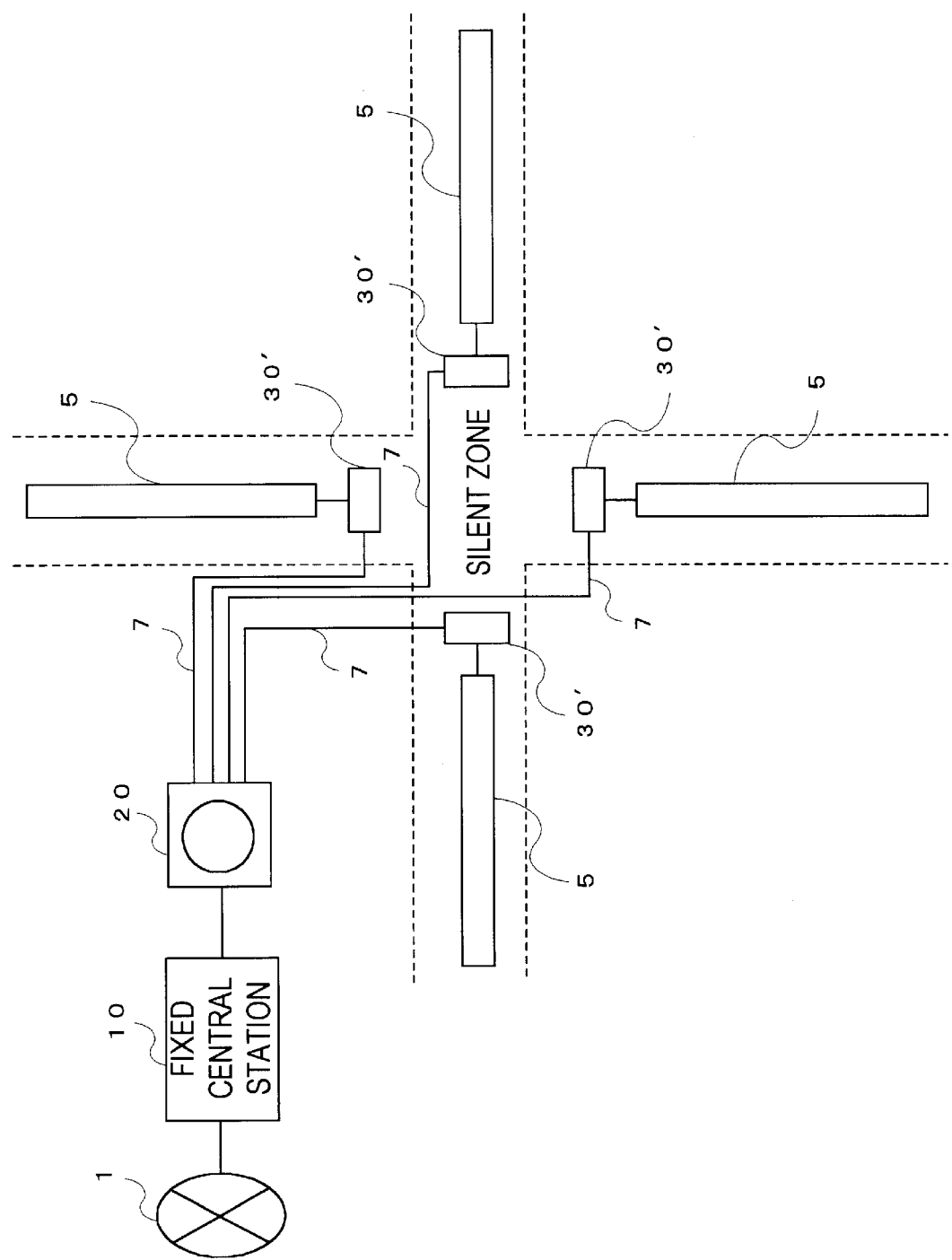
FIG. 3 is a block diagram of a relay system according to the third embodiment of the present invention.

Referring next to FIG. 3, description will be made with respect to a relay system according to the third embodiment of the present invention (third system), which is adapted to a case where the silent zone has branches. FIG. 3 is a block diagram of such a relay system according to the third embodiment of the present invention.

For simplification, the following description is made to a case where the third system is used for a one-way communication with pagers and the like in the same manner as the first system, but it may be a relay system corresponding to the second system.

A case where the silent zone is cross-shaped and leakage coaxial cables are installed on all sides from the intersection is taken by way of example to describe the third system of FIG. 3.

As shown in FIG. 3, the third system is mainly constituted of the public telecommunication network 1, the fixed central station 10, optical fiber 7, an optical star coupler 20, four fixed relay stations 30' and four leakage coaxial cables 5.

Although each specific portion will be described below, the fixed central station 10 is the same as that previously described, and the description thereof is omitted.

The optical star coupler 20 is the same as the conventional optical star coupler 20, and is operative to transmit an optical signal from the fixed central station 10 while distributing it to a plurality of fixed relay stations 30' through optical fiber.

Since in FIG. 3 the optical star coupler 20 is assumed suitable for the silent zone crossing on all sides, a one-to-four optical star coupler is used.

Each of the fixed relay stations 30' with the leakage coaxial cables 5 is the same as the combination in the first system, and is installed in each branch of the crossroads.

Particularly, it is important to lay each leakage coaxial cable 5 along each branch of the crossroads.

That is, the third system is such that an optical signal from the fixed central station 10 is distributed by the optical star coupler 20, transmitted to the fixed relay stations 30' laid along respective branches of the crossroads, and transduced into a radio-frequency signal at each fixed relay station 30' for radiation through each leakage coaxial cable 5 laid along each branch.

Thus, the third system can use such easy-to-construct optical fiber as to repeat down-link signals throughout the silent zone crossing on all sides.

The system may be modified to be a relay system for covering a silent zone with branches such as a tunnel, in which the optical star coupler 20 has one-to-many correspondence, each fixed relay station 30' is installed on each branch and each leakage coaxial cable 5 is laid along the branch.

An auxiliary amplifier 6 may also be inserted in the middle of the coaxial cable 5 to amplify the radio-frequency signal passing through the leakage coaxial cable 5 so as to extend the extension distance of the leakage coaxial cable 5.

Figure 4:
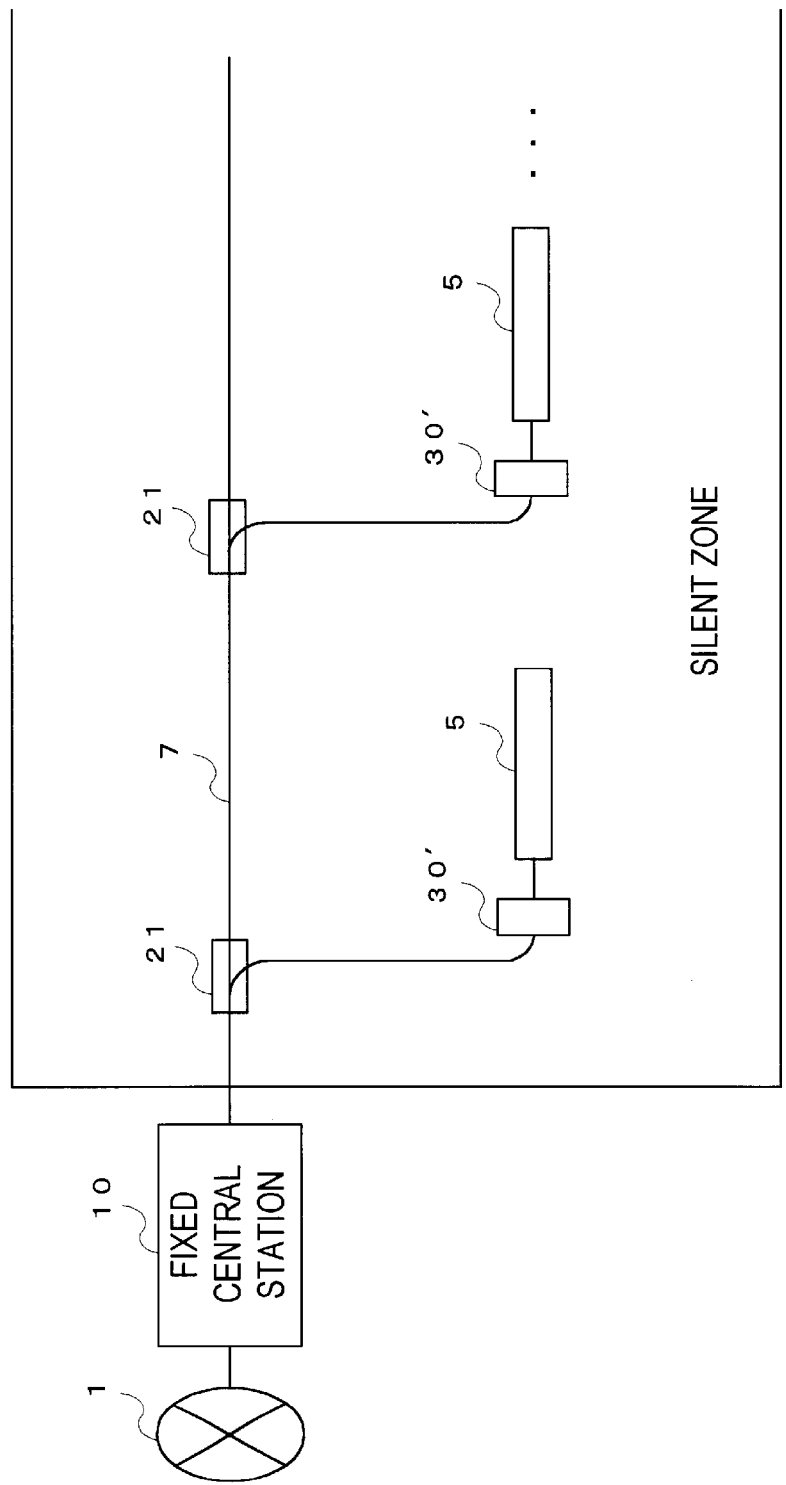
FIG. 4 is a block diagram of a relay system according to the fourth embodiment of the present invention.

Referring next to FIG. 4, description will be made with respect to a relay system according to the fourth embodiment of the present invention (fourth system), which is adapted to a case where the silent zone spreads in a very long line. FIG. 4 is a block diagram of such a relay system according to the fourth embodiment of the present invention.

The fourth system is applied to a case where a multistep connection of the leakage coaxial cable with the auxiliary amplifiers is not enough to cover the entire silent zone because of occurrence of attenuation, noise and distortion, in which an optical fiber line is laid throughout the silent zone. In the optical fiber line, an optical signal is branched properly by optical branch units, and transduced into a radio-frequency signal for radiation. through each leakage coaxial cable. The system can thus use such easy-to-construct optical fiber as to cover the entire silent zone while maintaining desired communication quality.

As shown in FIG. 4, the fourth system is mainly constituted of the fixed central station 10, an optical fiber cable laid throughout the silent zone, a plurality of optical branch units 21, the fixed relay stations 30' provided for respective optical branch units 21, and the leakage coaxial cables 5 connected to respective fixed relay stations 30'.

Although each specific portion will be described below, the fixed central station 10 and the fixed relay stations 30' are the same as those of the second system of FIG. 2, and description thereof is omitted.

Each of the optical branch units 21 includes a one-to-two optical coupler for up links and a one-to-two optical coupler for down links, and is inserted in the line of optical fiber laid throughout the silent zone. The optical branch units 21 branch an optical signal passing through the optical fiber in a prescribed ratio of light intensity (optical branch ratio) to output the branched optical signal to corresponding fixed relay stations 30', respectively.

Preferably, the leakage coaxial cables 5 are laid substantially in parallel to the optical fiber 7 so that the entire silent zone can be covered without omission.

That is, the fourth system is such that an optical signal from the fixed central station 10 is branched properly by the optical branch units, and transduced into a radio-frequency signal at each fixed relay station 30' for radiation through each leakage coaxial cable 5.

It should be noted that since the optical fiber used here is a single-core multi-branch optical transmission line for branching an optical signal from optical fiber in the neighborhood of the fixed relay stations 30', the optical branch ratio of the optical branch unit 21 may be set in accordance with the principle described in "Single Fiber Multi Terminal Optic Links for Mobile Radio Communications Using Automatic Wavelength-Offset Control" of Tarusawa, et. al. from Technical Report of IEICE RCS94-70 (September 1994) published by The Institute of Electronics, Information and Communication Engineers.

For the branch ratio of the optical coupler for down links, if the intensity Pr of an optical signal input to the opto-electric transducer 31 of each fixed relay station 30' is kept at a constant value, the amplifiers of each fixed relay station 30' can be designed to have a common gain so as to achieve a cost-efficient system.

From this point of view, the branch ratio (coupling coefficient) Ki of an optical coupler for i-th fixed relay station is determined by the following equation (1).

$$K_i = \frac{K_L^{i-2}}{\sum_{i=1}^{N-2} K_L^i + 2} \tag{1}$$

In this equation, KL denotes a leak through optical fiber and i is 3 or more. Then, the coupling coefficient KN of an optical coupler closest to the fixed central station is shown by the following equation (2).

$$K_N = \frac{K_L^{N-2}}{\sum_{i=1}^{N-2} K_L^i + 2} \tag{2}$$

Further, when the intensity of the optical signal from the electro-optic transducer 11 of the fixed central station 10 is Ps, the light receiving level Pr of each fixed relay station is obtained from the following equation (3).

$$P_r = \frac{K_L^{N-1}}{\sum_{i=1}^{N-2} K_L^i + 2} \cdot P_s \tag{3}$$

It should be noted that coupling coefficients of the optical couplers for up links can be calculated in the same manner as those of the optical couplers for down links.

Figure 5:
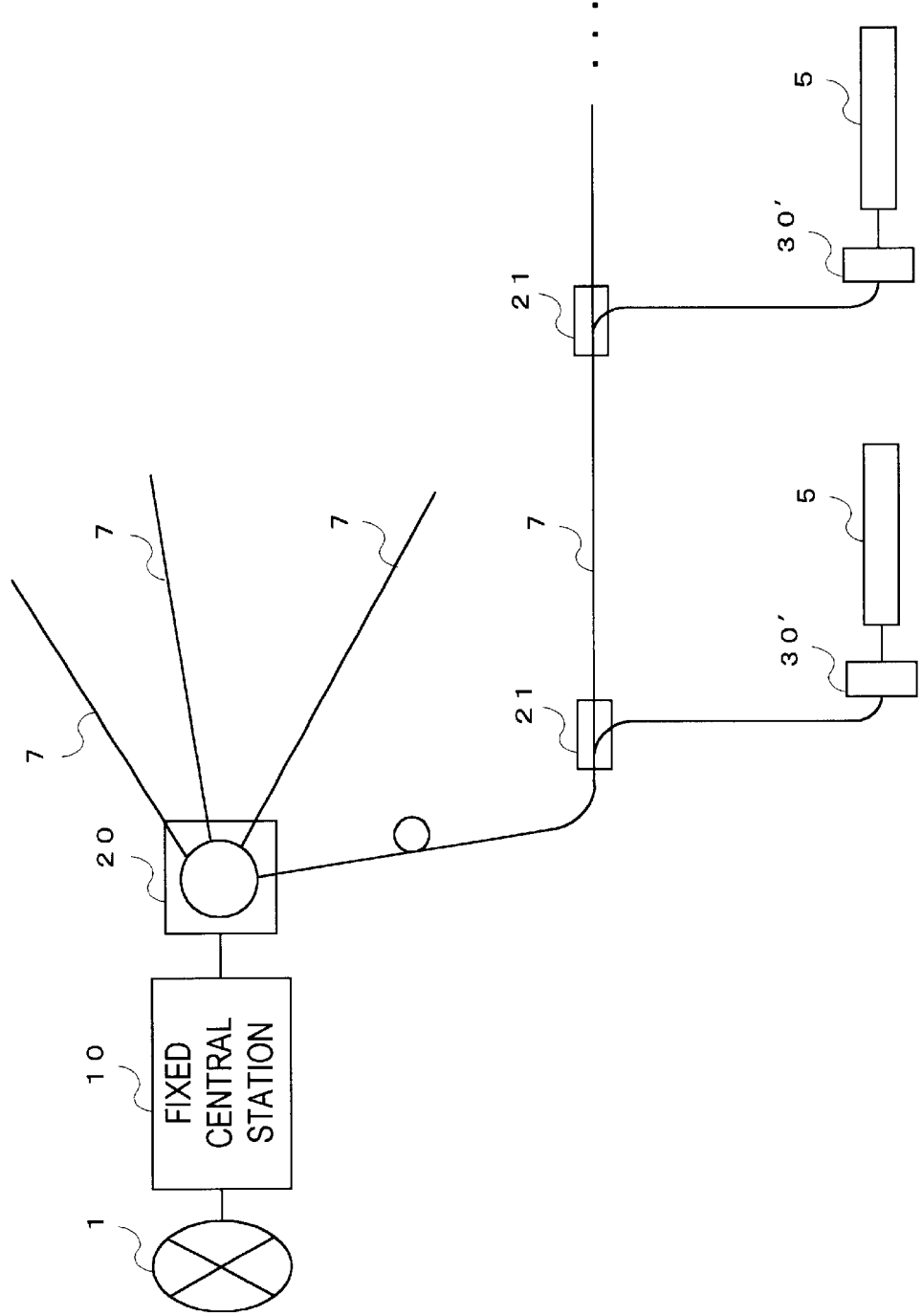
FIG. 5 is a block diagram of an example of a relay system using a combination of the systems according to the first to fourth embodiments.

These first to fourth systems may be used in combination such as one shown in FIG. 5, where an optical signal from the fixed central station 10 is branched by the optical star coupler 20 having one-to-many correspondence, transmitted through an optical-fiber cables network 7 laid throughout a silent zone for transmission to plural fixed relay stations 30', further branched as required by insertion of the optical branch units 21, and transduced into a radio-frequency signal at each fixed relay station 30' for radiation through the leakage coaxial cable 5. connected to the fixed relay station 30'. FIG. 5 is a block diagram of an example of such a relay system using a combination of the first to fourth systems.

Such a combination of the first to fourth systems allows relay of signals throughout any actually complicated-shaped silent zone.

It should be noted that the optical signals used in the first to fourth systems are ones analog-modulated by a known modulation technique such as direct intensity modulation of semiconductor laser.

In general, since the semiconductor laser for optical communication and the photodiode as light demodulator have a modulation band (response band) of about several GHz, it can be considered that frequency-multiplexed plural signals are combined for modulation into an optical signal.

There are shown here only a pair of radio modulator 2 and amplifier 4 for simplification of the drawing, but a plurality of pairs of radio modulator 2 and amplifier 4 can be provided for batch transduction of various kinds of radio-frequency signals into an optical signal, i.e., for subcarrier-multiplexed analog transmission. In this case, respective modulators modulate individual different carrier (subcarrier) frequencies to obtain radio-frequency signals. The radio-frequency signals are then combined for modulating carriers (main carriers) of respective optical signals therewith.

Figure 6:
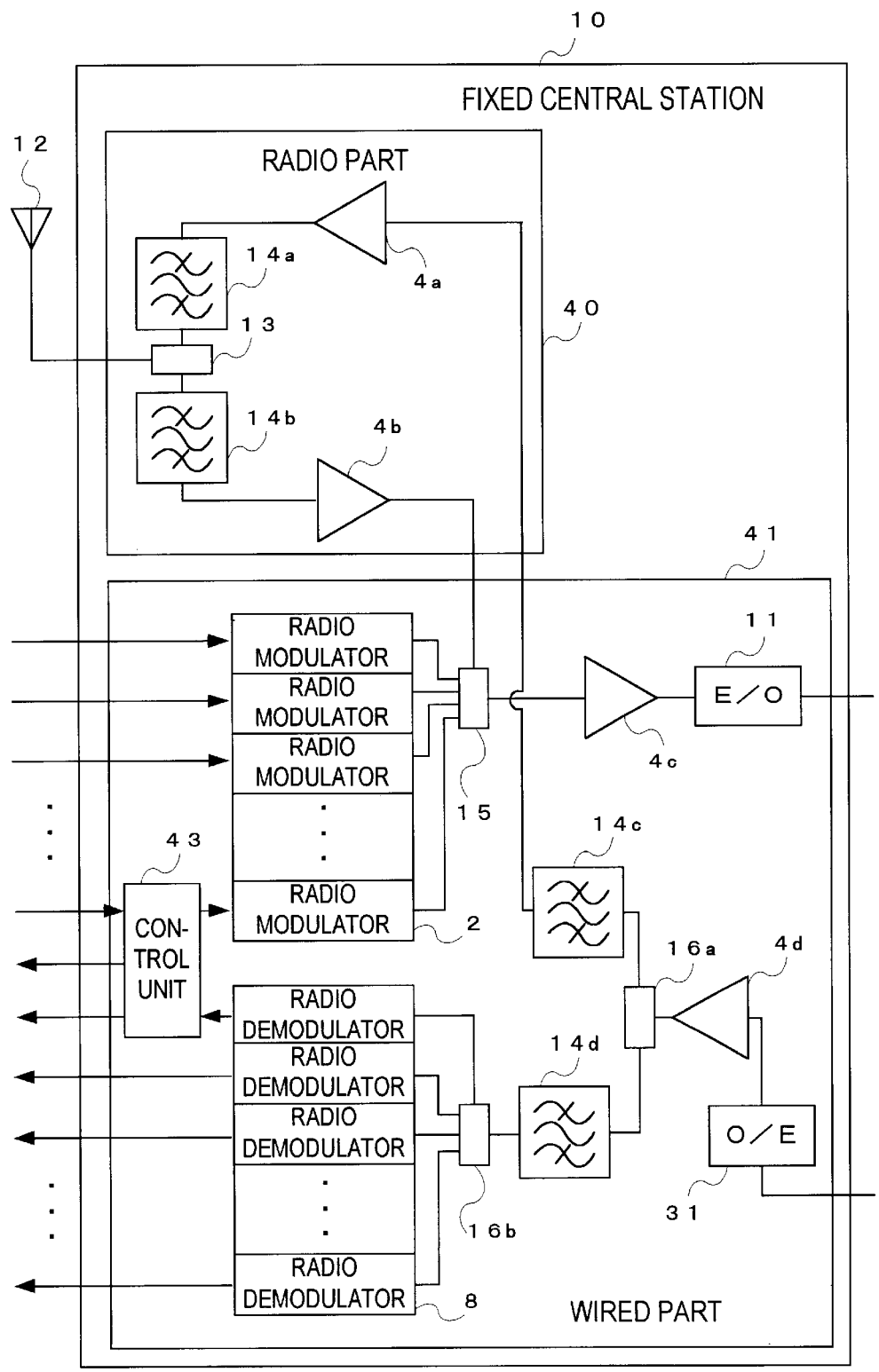
FIG. 6 is a block diagram of a fixed central station 10 in a relay system according to the fifth embodiment of the present invention.

As shown in FIG. 6, in such a system (fifth system) as to repeat various kinds of signals together while remotely controlling and monitoring system setting, the fixed central station 10 includes a radio part 40 equipped with an antenna 12, a multiplexer 13, a first up-link filter 14a, a first down-link filter 14b, a first amplifier 4a and a second amplifier 4b; a wired part 41 equipped with plural radio modulators 2, a synthesizer 15, a third amplifier 4c, an electro-optic transducer 11, an opto-electric transducer 31, a fourth amplifier 4d, a first distributor 16a, a second up-link filter 14c, a second down-link filter 14d, a second distributor 16b, and radio demodulators 8; and a control unit 43 connected to a public telecommunication network for controlling and monitoring the fixed relay stations 30'. FIG. 6 is a block diagram of the fixed central station of such a relay system according to the fifth embodiment of the present invention.

It should be noted that various kinds of signals include signals used for portable telephones, one-way radio paging, two-way radio paging, business radio communications such as police and fire fighting radio, television broadcasting, radio broadcasting, cable broadcasting, cable television broadcasting and data communications, and a signal for monitoring and controlling the fixed relay stations in the system (supervisory signal or control signal).

Hereinbelow, each specific portion will be described.

The radio part 40 is such that an incoming signal from a base station or broadcasting station to the antenna 12 is passed through the multiplexer 13 and the first down-link filter 14b, and amplified by the second amplifier 4b for output to the wired part 41, while an up-link signal distributed from the wired part 41 is amplified by the first amplifier 4a, and passed through the first up-link filter 14a and the multiplexer 13 for transmission from the antenna 12.

In the wired part 41, signals input by wire from various communications systems such as a portable telephone system and a train radio system are transferred to corresponding radio modulators 2 provided for respective systems. Each modulator 2 modulates a carrier allocated for each input signal with each corresponding system signal to obtain a radio-frequency signal. These radio-frequency signals from the modulators 2 are combined with the down-link signal from the radio part 40 by means of the synthesizer 15, amplified by the third amplifier 4c, and transduced by the electro-optic transducer 11 into an optical signal for output to the fixed relay stations 30' through optical fiber 7.

On the other hand, optical signals input from the fixed relay stations 30' to the wired part 41 is transduced into electric radio-frequency signals by means of the opto-electric transducer 31, amplified by the fourth amplifier 4d, and distributed by the first distributor 16a into a signal to be output to the radio part 40 and signals to be output to the second distributor 16b. The signal to be output to the radio part 40 is passed through the second up-link filter 14a so that the band thereof is limited prior to output.

The signals output from the first distributor 16a to the second distributor 16b are distributed by the second distributor 16b to respectively corresponding ones of plural radio demodulators 8 provided for respective systems, and demodulated respectively for output to corresponding systems through respective cables.

The control unit 43 recognizes the status of each fixed relay station 30' in response to input of a supervisory signal, indicative of the operation status of the fixed relay station 30', from the lower fixed relay station 30' through the wired part 41, to output a control signal to the fixed relay station 30' through the wired part 41 for controlling the fixed relay station 30' in accordance with the operation status.

When recognizing occurrence of abnormality in a fixed relay station 30' from the supervisory signal, the control unit 43 outputs to the fixed relay station 30' such a control signal as to instruct system reset, power off or alarm indication, or outputs a control signal to control setting of the amplification gain in accordance with the status of the fixed relay station 30'.

The control signal from the control unit 43 is processed in the same manner as the other signals for various communications systems. That is, a specified carrier frequency is modulated with the control signal by means of the radio modulator 2 for the control unit 43 to obtain a radio-frequency signal, combined by the synthesizer 15 with the other down-link signals from the other radio modulators 2 and the radio part 40, and transduced into an optical signal by means of the electro-optic transducer 11.

On the other hand, the supervisory signal from each fixed relay station 30' is multiplexed and transduced into an electric radio-frequency signal, distributed by the first distributor 16a and the second distributor 16b, demodulated by the radio demodulator 8 for the control unit 43 and output to the control unit 43.

The control unit 43 may also be connected to a monitor unit with a display so that the operation status of the fixed central station 10 itself and the fixed relay stations 30' is made visible through the monitor unit. The monitor unit may be a note type personal computer (PC).

The fixed central station 10 monitors the operation status of plural fixed relay stations 30' to output a control signal in accordance with the operation status of each fixed relay station 30', and this makes possible easy and proper management (house keeping) of the system consisting of the fixed central station 10 and the fixed relay stations 30' connected thereto.

Further, the control unit 43 can establish a two-way connection with an upper monitor station (not shown) through a public telecommunication network or private line to report to the monitor station occurrence of an emergent alarm in the fixed central station 10 itself or a lower fixed relay station 30', periodically report operating conditions of the system, or transmit a control signal to the lower reaches in response to input of an instruction signal from the monitor station.

In this case, when an emergent alarm occurs in the fixed central station 10 itself or a lower fixed relay station 30', the fixed central station 10 automatically issues a report to the monitor station on the occurrence of an emergent alarm. Upon receipt of the report, the upper monitor station is given an alarm or blink indication to output an instruction signal to the fixed central station 10. The fixed central station 10 then outputs a control signal to the lower fixed relay stations 30' in response to input of the instruction signal. The instruction signal may include instructions such as for system operation to alter system setting to each of the fixed central station and the fixed relay stations 30', or for control of individual reset and power-off.

The periodical report of system operating conditions may be made at the discretion of the fixed central station 10, or when requested by the upper monitor station.

The periodical report from each fixed relay station 30' may also be made at the discretion of the fixed relay station 30', or when requested by the fixed central station 10 or the upper monitor station.

Thus, the management or housekeeping of the entire system including a plurality of fixed central stations 10 and fixed relay stations connected to each fixed central station can be remotely controlled by the upper monitor station.

Figure 7:
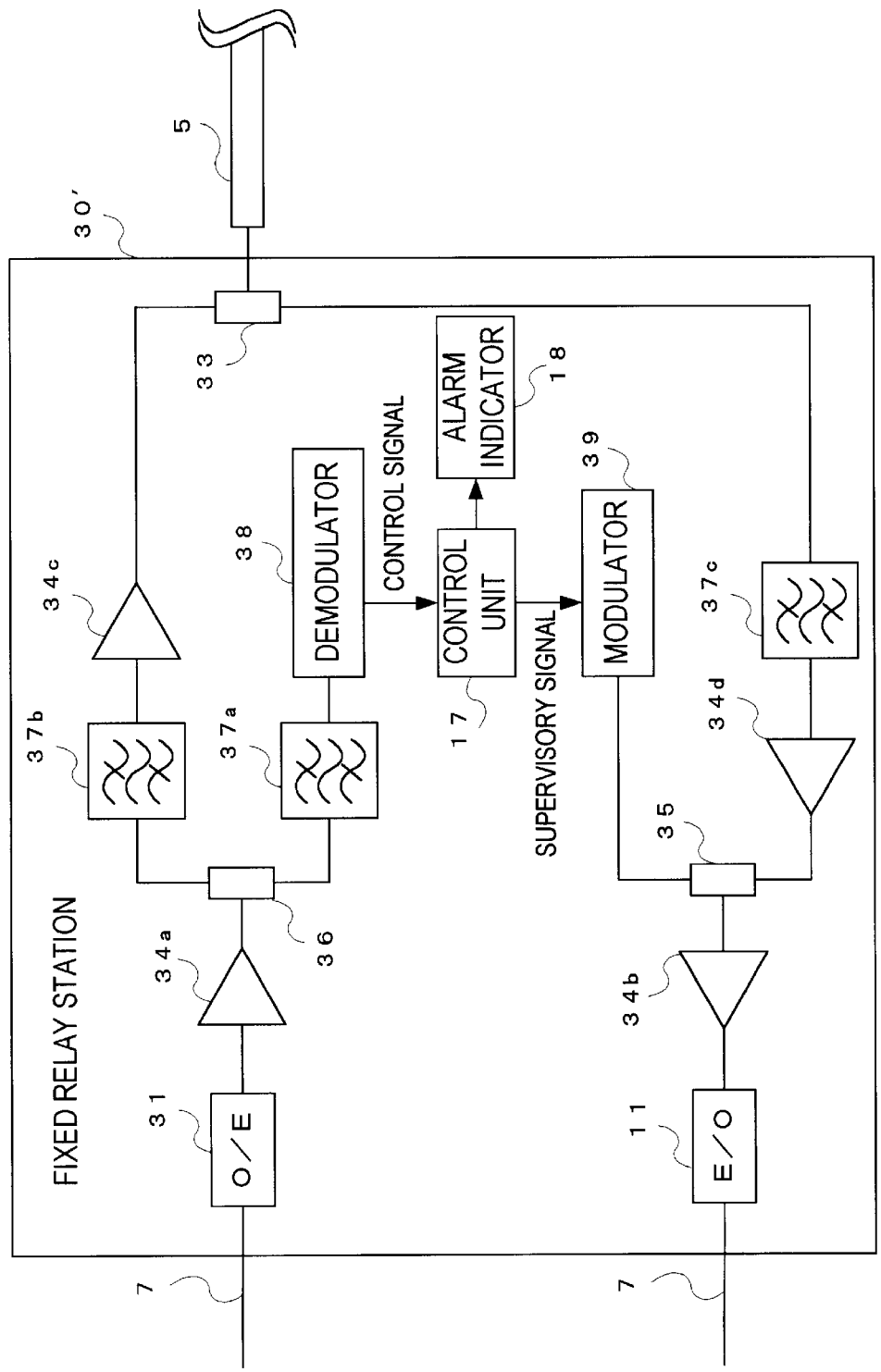
FIG. 7 is a block diagram showing an example of a fixed relay station 30' in the relay system according to the fifth embodiment of the present invention.

Referring next to FIG. 7, each fixed relay station 30' in the fifth system will be described. FIG. 7 is a block diagram of an example of a fixed relay station 30' in the fifth system.

The fixed relay station 30' may have either the same configuration as the fixed relay station 30' in the second system, or a configuration such as one shown in FIG. 7. The fixed relay station 30' of FIG. 7 includes a distributor 36 provided downstream of the first amplifier 34a for distributing one input signal to two branches, a first filter 37a for limiting the band of one of distributed signals to obtain such a control signal as to control the fixed relay station 30', a second filter 37b for limiting the band of the other of distributed signals, a demodulator 38 for demodulating the control signal input through the first filter 37a, a control unit 17 for executing control operation within the fixed relay station 30' in response to input of the control signal and monitoring the operation status of each part of the station to output a supervisory signal, an alarm indicator 18 for giving an alarm indication in accordance with instructions from the control unit 17, a third amplifier 34c for amplifying the other signal input through the second filter 37b, a multiplexer 33 for outputting the amplified signal to the leakage coaxial cable 5, a third filter 37c for limiting the band of an incoming signal from the leakage coaxial cable 5 via the multiplexer 33, a fourth amplifier 34d for amplifying the signal input from the third filter 37c, a modulator 39 for modulating a supervisory signal indicative of the status of the fixed relay station 30', and a synthesizer 35 for combining the input signal from the fourth amplifier 34d and the input signal from the modulator 39 for output to the second amplifier 34b.

In such a fixed relay station 30', when a control signal is input from the demodulator 38 to the control unit 17, the control unit starts control of each part of the fixed relay station 30' in accordance with the control signal.

If the control signal input to the control unit 17 is to instruct alarm indication, the control unit 17 outputs an instruction to the alarm indicator 18 to give an alarm indication. The instruction or control signal is also to instruct reset or power-off, or alternation of the system setting such as gain setting to the amplifiers.

The control unit 17 also monitors the operation conditions within the fixed relay station 30' to output a supervisory signal to the modulator 39 periodically or when requested by the monitor station or the fixed central station 10. The request from the monitor station is output to the fixed relay station 30' through the fixed central station 10. The supervisory signal is modulated by the modulator 39 into a radio-frequency signal, combined with the signal from the amplifier 34d, amplified by the amplifier 34b, and transduced into an optical signal by means of the electro-optic transducer 11 for transmission to the fixed central station 10 through optical fiber 7.

Thus, the fifth system can use such easy-to-construct optical fiber as to cover the entire silent zone of complicated structure to provide radio communication of desired communication quality. The system also allows various kinds of signals to be repeated with a simple configuration using a pair of optical fiber cables.

Further, in the fifth system the operation status of each fixed relay station 30' can be reported to and managed by the fixed central station 10 or the monitor station, and system setting such as gain setting or other system operation can be remotely controlled by the fixed central station 10 or the monitor station. This makes possible easy and proper management (house keeping) of the entire system.

Figure 8:
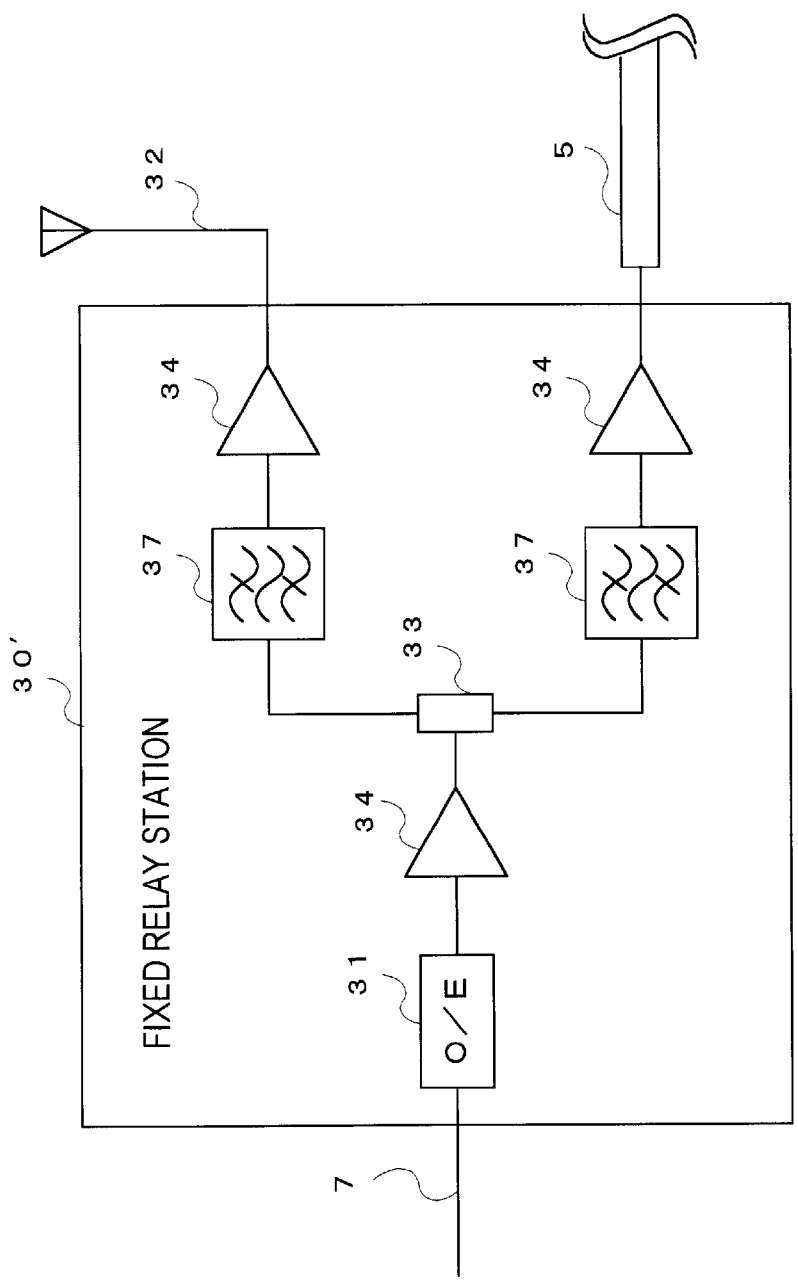
FIG. 8 is a block diagram showing another example of the fixed relay station 30' in the relay system according to the fifth embodiment of the present invention.

When the fixed relay station is used both in a wide service area such as for train radio to issue train traveling instructions along all the railway-tracks in a subway system or the like, and in a spot service area such as for portable telephones and radio paging on a platform or concourse, the fifth system may be modified as shown in FIG. 8 to comprise a fixed relay station 30', a leakage coaxial cable 5 and an optical fiber cable 7, where the fixed relay station 30' selects either the leakage coaxial cable 5 or the antenna 32 as required. FIG. 8 is a block diagram of another example of the fixed relay station 30' in the fifth system.

In the first to fifth systems, the fixed central station 10 may provide power for the fixed relay stations 30'.

In this case, a combined cable with a power cable and an optical cable 7 may be used.

According to the first relay system of the present invention, the fixed central station converts a signal from a public telecommunication network into a radio-frequency signal through the radio modulator for repeating the signal and transduces the radio-frequency signal into an optical signal for output to a plurality of fixed relay stations distributed in a silent zone, while each of the fixed relay stations transduces the optical signal into a radio-frequency signal for radiation into the silent zone through the leakage coaxial cable, whereby even when the silent zone is of linear structure such as a tunnel or underpass, any mobile station can receive radio signals of desired communication quality from the public telecommunication network.

According to the second relay system of the present invention, the fixed central station converts a signal from a public telecommunication network into a radio-frequency signal through the radio modulator for repeating the signal and transduces the radio-frequency signal into an optical signal for output to a plurality of fixed relay stations distributed in a silent zone, while it transduces into a radio-frequency signal an optical signal input from each fixed relay station and demodulates it for output to the public telecommunication network. On the other hand, each of the fixed relay stations transduces into a radio-frequency signal the optical signal input from the fixed central station for radiation into the silent zone through the leakage coaxial cable, while it transduces into an optical signal an incoming radio-frequency signal from the leakage coaxial cable for output to the fixed central station. In such a configuration, even when the silent zone is of linear structure such as a tunnel or underpass, any down-link signal from the public telecommunication network can be repeated throughout the silent zone, while any up-link signal radiated from mobile stations existing in the silent zone can be repeated to the public telecommunication network.

According to the third relay system of the present invention, the fixed central station equipped with an antenna combines an incoming radio signal from the antenna with plural radio-frequency signals obtained through plural radio modulators from various kinds of signals input from the outside through cables and transduces the combined radio-frequency signal into an optical signal for output to the fixed relay stations, while it transduces optical signals from the fixed relay stations into radio-frequency signals, distributes the radio-frequency signals into a signal to be radiated by radio and signals to be output through cables. The signal to be radiated by radio is radiated from the antenna, while the signals to be output by wire are further distributed according to the signal type and demodulated respectively for output to the outside through the cables. In such a configuration, even when the silent zone is of linear structure such as a tunnel or underpass, various kinds of signals can be repeated with a simple configuration using a pair of optical fiber cables in such a way that any down-link signal from a public telecommunication network is repeated throughout the silent zone and any up-link signal radiated from mobile stations existing in the silent zone is repeated to the public telecommunication network.

According to the fourth relay system of the present invention, each of the fixed relay stations transduces into a radio-frequency signal an optical signal input from the fixed central station for radiation into the silent zone through the leakage coaxial cable, while it demodulates a control signal from the radio-frequency signal for control of each part thereof by means of the control unit in accordance with the control signal. The fixed relay station also transduces into an optical signal an incoming signal from the leakage coaxial cable for output to the fixed central station. In such a configuration, even when the silent zone is of linear structure such as a tunnel or underpass, any down-link signal from a public telecommunication network can be repeated throughout the silent zone and any up-link signal radiated from mobile stations existing in the silent zone can be repeated to the public telecommunication network, while remotely controlling system setting to the fixed relay stations.

According to the fifth relay system of the present invention, each of the fixed relay stations transduces into a radio-frequency signal an optical signal input from the fixed central station for radiation into the silent zone through the leakage coaxial cable, while it monitors each part thereof by means of the control unit to output a supervisory signal. The fixed relay station also combines an incoming signal from the leakage coaxial cable with a radio-frequency signal modulated from the supervisory signal, and transduces the combined signal into an optical signal for output to the fixed central station. In such a configuration, even when the silent zone is of linear structure such as a tunnel or underpass, any down-link signal from a public telecommunication network can be repeated throughout the silent zone and any up-link signal radiated from mobile stations existing in the silent zone can be repeated to the public telecommunication network, while remotely monitoring the operation status of each fixed relay station.

According to the sixth relay system of the present invention, each of the fixed relay stations transduces into a radio-frequency signal an optical signal input from the fixed central station for radiation into the silent zone through the leakage coaxial cable, while it demodulates a control signal from the radio-frequency signal. The control unit controls each part of the fixed relay station itself in accordance with the control signal, while it monitors each part thereof to output a supervisory signal. The fixed relay station also combines an incoming signal from the leakage coaxial cable with a radio-frequency signal modulated from the supervisory signal, and transduces the combined signal into an optical signal for output to the fixed central station. In such a configuration, even when the silent zone is of linear structure such as a tunnel or underpass, any down-link signal from a public telecommunication network can be repeated throughout the silent zone and any up-link signal radiated from mobile stations existing in the silent zone can be repeated to the public telecommunication network, while remotely controlling recovery from abnormality in a fixed relay station and system setting to the fixed relay station by monitoring the operation status of each fixed relay station.

According to the present invention, the first fixed central station combines an incoming radio signal from the antenna with plural radio-frequency signals obtained through plural radio modulators from various kinds of signals input through cables and transduces the combined radio-frequency signal into an optical signal for output to the fixed relay stations, while it transduces optical signals from the fixed relay stations into radio-frequency signals, distributes the radio-frequency signals into a signal to be radiated by radio and signals to be output through cables. The signal to be radiated by radio is radiated from the antenna, while the signals to be output by wire are further distributed according to the signal type and demodulated respectively for output to the outside through the cables. Further, in the fixed central station the control unit outputs a control signal to corresponding one of the radio modulator in response to input of a supervisory signal from a fixed relay station for control of the fixed relay station in accordance with the operation status of the fixed relay station. In such a configuration, even when the silent zone is of linear structure such as a tunnel or underpass, various kinds of signals can be repeated with a simple configuration using a pair of optical fiber cables in such a way that any down-link signal from a public telecommunication network is repeated throughout the silent zone and any up-link signal radiated from mobile stations existing in the silent zone is repeated to the public telecommunication network, while remotely controlling recovery from abnormality in a fixed relay station and system setting to the fixed relay station by monitoring the operation status of each fixed relay station at the fixed central station.

According to the second fixed central station of the present invention, the control unit outputs a signal indicative of the operation status of each fixed relay station to an upper monitor station located outside, while it outputs a control signal to the radio modulator for control of the fixed relay station in accordance with an instruction signal from the upper monitor station, thereby remotely controlling recovery from abnormality in a fixed relay station and system setting to the fixed relay station while monitoring the operation status of each fixed relay station at the upper monitor station.

According to the third fixed central station of the present invention, the control unit outputs to the radio modulator such a control signal as to normalize a fixed relay station based on the supervisory signal from the fixed relay station when the fixed central station recognizes occurrence of abnormality in the fixed relay station, thereby normalizing a fixed relay station immediately when abnormality occurs in the fixed relay station while monitoring the operation status of each fixed relay station at the central station.

According to the present invention, the sixth relay system comprises the first fixed central station, whereby even when the silent zone is of linear structure such as a tunnel or underpass, various kinds of signals can be repeated with a simple configuration using a pair of optical fiber cables in such a way that any down-link signal from a public telecommunication network is repeated throughout the silent zone and any up-link signal radiated from mobile stations existing in the silent zone is repeated to the public telecommunication network, while remotely controlling recovery from abnormality in a fixed relay station and system setting to the fixed relay station by monitoring the operation status of each fixed relay station at the fixed central station.

According to the present invention, the sixth relay system comprises the second fixed central station, thereby remotely controlling recovery from abnormality in a fixed relay station and system setting to the fixed relay station while monitoring the operation status of each fixed relay station at the upper monitor station.

According to the present invention, the sixth relay system comprises the third fixed central station, thereby normalizing a fixed relay station immediately when abnormality occurs in the fixed relay station while monitoring the operation status of each fixed relay station at the central station.

What is claimed is:

1. A relay system comprising a fixed central station, installed outside of silent zones, which transduces a radio-frequency signal into an optical signal to output the optical signal for repeating the radio-frequency signal, and transduces into a radio-frequency signal an optical signal input from a silent zone through optical fiber; and a plurality of fixed relay stations, distributed in the silent zone, each of which transduces into a radio-frequency signal the optical signal input from said fixed central station through optical fiber for radiation into the silent zone through a leakage coaxial cable laid across the silent zone, and transduces into an optical signal a radio-frequency signal received through the leakage coaxial cable from a mobile station existing in the silent zone for output to said fixed central station, wherein each of said fixed relay stations includes an opto-electric transducer for transducing the optical signal from said fixed central station into a radio-frequency signal, a distributor for distributing the radio-frequency signal to two branches, a demodulator for demodulating a control signal from the radio-frequency signal distributed to one branch for control of the fixed relay station, a control unit for controlling each part of the fixed relay station in accordance with the control signal, a multiplexer for outputting the radio-frequency signal distributed to the other branch to the leakage coaxial cable and outputting an incoming radio-frequency signal from the leakage coaxial cable, and an electro-optic transducer for transducing the radio-frequency signal from said multiplexer into an optical signal for output to said fixed central station.

2. A relay system comprising a fixed central station, installed outside of silent zones, which transduces a radio-frequency signal into an optical signal to output the optical signal for repeating the radio-frequency signal, and transduces into a radio-frequency signal an optical signal input from a silent zone through optical fiber; and a plurality of fixed relay stations, distributed in the silent zone, each of which transduces into a radio-frequency signal the optical signal input from said fixed central station through optical fiber for radiation into the silent zone through a leakage coaxial cable laid across the silent zone, and transduces into an optical signal a radio-frequency signal received through the leakage coaxial cable from a mobile station existing in the silent zone for output to said fixed central station, wherein each of said fixed relay stations includes an opto-electric transducer for transducing the optical signal from said fixed central station into a radio-frequency signal, a multiplexer for outputting the radio-frequency signal to the leakage coaxial cable and outputting an incoming radio-frequency signal from the leakage coaxial cable, a control unit for monitoring the operation status of each part of the fixed relay station to output a supervisory signal, a modulator for modulating the supervisory signal into a radio-frequency signal, a synthesizer for combining the radio-frequency signal modulated by said modulator and the radio-frequency signal input from said multiplexer, and an electro-optic transducer for transducing the radio-frequency signal from said synthesizer into an optical signal for output to said fixed central station.

3. A relay system comprising a fixed central station, installed outside of silent zones, which transduces a radio-frequency signal into an optical signal to output the optical signal for repeating the radio-frequency signal, and transduces into a radio-frequency signal an optical signal input from a silent zone through optical fiber; and a plurality of fixed relay stations, distributed in the silent zone, each of which transduces into a radio-frequency signal the optical signal input from said fixed central station through optical fiber for radiation into the silent zone through a leakage coaxial cable laid across the silent zone, and transduces into an optical signal a radio-frequency signal received through the leakage coaxial cable from a mobile station existing in the silent zone for output to said fixed central station, wherein each of said fixed relay stations includes an opto-electric transducer for transducing the optical signal from said fixed central station into a radio-frequency signal, a distributor for distributing the radio-frequency signal to two branches, a demodulator for demodulating a control signal from the radio-frequency signal distributed to one branch for control of the fixed relay station, a control unit for controlling each part of the fixed relay station in accordance with the control signal and monitoring the operation status of each part of the fixed relay station to output a supervisory signal, a multiplexer for outputting the radio-frequency signal distributed to the other branch to the leakage coaxial cable and outputting an incoming radio-frequency signal from the leakage coaxial cable, a modulator for modulating the supervisory signal into a radio-frequency signal, a synthesizer for combining the radio-frequency signal modulated by said modulator and the radio-frequency signal input from said multiplexer, and an electro-optic transducer for transducing the radio-frequency signal from said synthesizer into an optical signal for output to said fixed central station.

4. A fixed central station installed outside of silent zones, comprising an antenna, a radio part, a wired part and a control unit, which transduces a radio-frequency signal into an optical signal for repeating the radio-frequency signal to output the optical signal through optical fiber to fixed relay stations installed in a silent zone, and transduces into a radio-frequency signal an optical signal input from each fixed relay station through optical fiber, wherein said radio part outputs an incoming signal from said antenna as a radio-frequency signal and takes in a radio-frequency signal to radiate the input radio-frequency signal from said antenna to the outside, said wired part includes plural radio modulators for modulating individually specified carrier frequencies with various kinds of signals input from the outside or said control unit through cables to obtain radio-frequency signals, a synthesizer for combining the radio-frequency signal from said radio part with the radio-frequency signals from said plural radio modulators to output a combined radio-frequency signal, an electro-optic transducer for transducing the combined radio-frequency signal into an optical signal for output to said fixed relay stations, an opto-electric transducer for transducing into radio-frequency signals the optical signals input from said fixed relay stations, a first distributor for distributing the radio-frequency signals input from said opto-electric transducer into a radio-frequency signal to be radiated from said antenna of said radio part and radio-frequency signals to be output to the outside through cables, a second distributor for distributing the radio-frequency signals input from said first distributor for output to the outside through the cables, and plural radio demodulators for demodulating various kinds of signals from the radio-frequency signals respectively input from said second distributor, and said control unit, connected to one of said radio modulators and one of said radio demodulators, recognizes the operation status of each fixed relay station based on a supervisory signal input from the fixed relay station through the radio demodulator to output a control signal to the radio modulator for control of the fixed relay station in accordance with the operation status.

5. A fixed central station according to claim 4, wherein said control unit outputs a signal indicative of the operation status of each fixed relay station to an upper monitor station located outside, and outputs a control signal to the radio modulator for control of the fixed relay station in accordance with an instruction signal from the upper monitor station.

6. A relay system comprising said fixed central station accordingly to claim 5.

7. A fixed central station according to claim 4, wherein said control unit outputs to the modulator such a control signal as to normalize a fixed relay station based on the supervisory signal from the fixed relay station when said fixed central station recognizes occurrence of abnormality in the fixed relay station.

8. A relay system comprising said fixed central station accordingly to claim 7.

9. A relay system comprising said fixed central station accordingly to claim 4.

* * * * *